United States Patent [19]

Bott

[11] 4,055,285
[45] Oct. 25, 1977

[54] ARTICLE SUPPORTING SLAT

[76] Inventor: John A. Bott, 931 Lake Shore Drive, Grosse Pointe Shores, Mich. 48236

[21] Appl. No.: 702,756

[22] Filed: July 6, 1976

Related U.S. Application Data

[63] Continuation of Ser. No. 486,416, July 8, 1974, abandoned.

[51] Int. Cl.² .............................................. B60R 9/04
[52] U.S. Cl. ................................ 224/42.1 D; 52/718; 248/345.1
[58] Field of Search ................. 224/42.1 D, 42.1 E, 224/42.1 F, 42.1 R, 29 R, 42.45 R; 293/54 D, 1 R; 52/716, 717, 718, 403, 396; 248/345.1; 296/28 D, 39

[56] References Cited

U.S. PATENT DOCUMENTS

| 3,127,965 | 4/1964 | Weisenberger | 52/718 |
| 3,130,822 | 4/1964 | Meyer | 52/718 |
| 3,504,473 | 4/1970 | Shanok et al. | 52/717 |
| 3,606,431 | 9/1971 | Kunevicius | 52/718 X |
| 3,836,194 | 12/1974 | Helm | 224/42.1 D |

Primary Examiner—Albert J. Makay
Assistant Examiner—Jerold M. Forsberg
Attorney, Agent, or Firm—Harness, Dickey & Pierce

[57] ABSTRACT

A load supporting slat is mounted on an automobile roof and forms a part of a luggage rack. The slat is made in two parts: an extruded plastic base and a stainless steel molding snap fitted over the base. The base insulates the roof from the steel molding, holds the molding and cooperates with the molding to carry the weight of luggage thereby permitting the molding to be made from very thin sheet stock.

4 Claims, 5 Drawing Figures

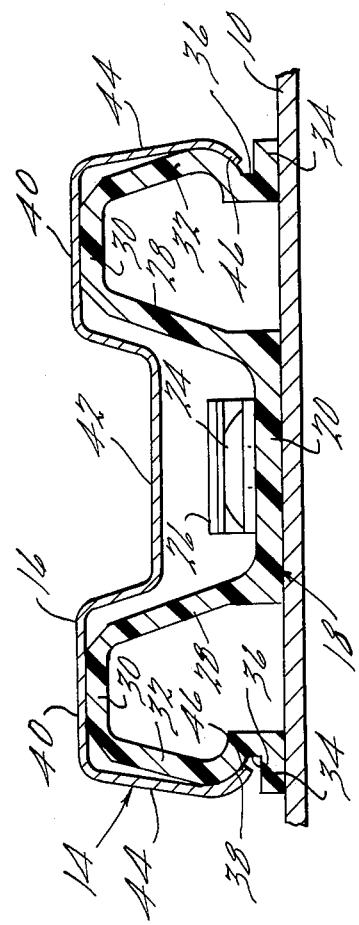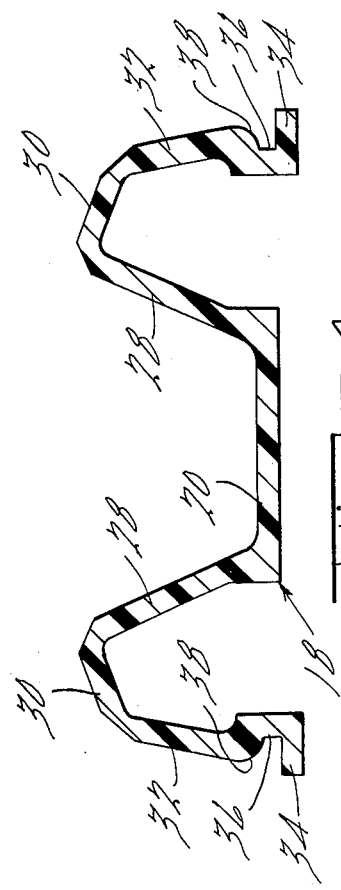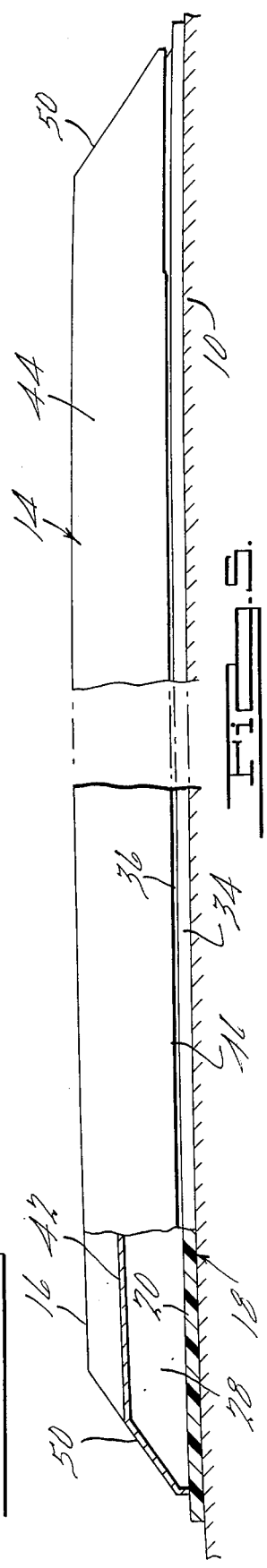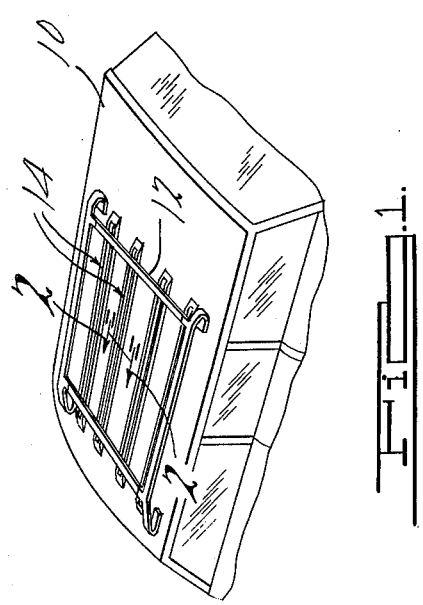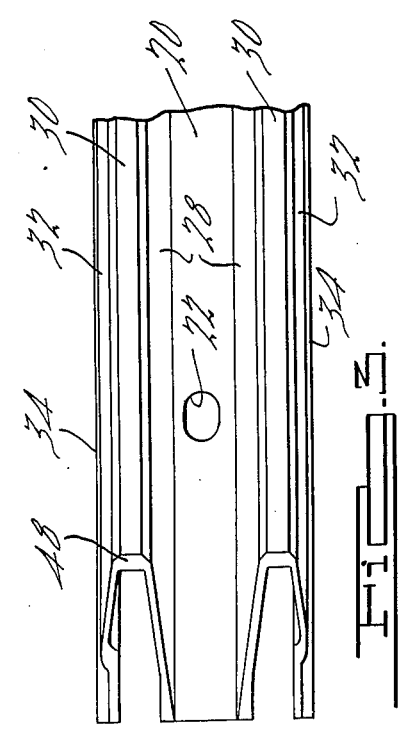

ARTICLE SUPPORTING SLAT

This is a continuation of application Ser. No. 486,416, filed July 8, 1974, now abandoned.

BACKGROUND OF THE INVENTION

Automobile luggage racks frequently employ a number of separate parallel slats mounted on the automobile roof to support the weight of luggage or other articles placed within the confines of the rack. These slats have generally been manufactured as either two or three piece assemblies including a rubber or plastic mounting pad and one or two elongated metal members resting on the pad. Smith U.S. Pat. No. 3,120,914 and Bott U.S. Pat. No. 3,253,755 show two piece slat constructions in which heavy duty steel or aluminum members are positioned on a resilient mounting pad. The metal used in these constructions was quite costly, however, and ways were sought to reduce the amount of stainless steel or other expensive metal in the construction. This resulted in three part slat assemblies such as those shown in Stephen U.S. Pat. No. 3,519,179 and Bott U.S. Pat. No. 3,615,069. These three part constructions utilize very thin stainless steel outer moldings and a heavier but lower cost steel channel member located between the stainless outer molding and a rubber mounting pad.

SUMMARY OF THE INVENTION

The structure of the present invention consists of a two part assembly yet an outer molding of expensive metal (e.g., stainless steel) is still made from very thin stock. This is accomplished but utilizing a plastic base member which combines the functions of a mounting pad, a structural support and a means of retention for the metal molding. The metal outer molding, in turn, assists the base member by protecting it from damage and helping to prevent excessive spreading or deflection of the walls of the base member. It is an object of the present invention to provide a multipart luggage rack slat which is low in cost, attractive in appearance, durable and strong in construction and easy to install on an automobile.

DESCRIPTION OF THE DRAWINGS OF THE PREFERRED EMBODIMENT

FIG. 1 is a fragmentary perspective view of an automobile roof showing a luggage rack mounted thereon having slats constructed in accordance with the principles of the present invention;

FIG. 2 is an enlarged sectional view of the structure illustrated in FIG. 1;

FIGS. 3 and 4 are top plan and cross sectional views, respectively, of the base member illustrated in FIG. 2; and FIG. 5 is a side elevational view with parts broken away of the slat illustrated in FIGS. 1 and 2.

DESCRIPTION OF THE PREFERRED EMBODIMENT

FIG. 1 depicts an automobile roof 10 having a luggage rack 12 mounted thereon. The luggage rack includes a plurality of separate spaced parallel slat assemblies 14. The present invention relates to the manner of construction of each of the slat assemblies 14, the details of which are best illustrated in FIG. 2. As shown in FIG. 2, each slat assembly 14 includes two separate parts: a metal molding 16 formed from stainless steel sheet material of rather thin walled stock and an extruded plastic base 18. The base 18 is preferably made from a high tensile strength synthetic plastic thermosetting material such as Nylon or Lexan. It will be noted that the base 18 has a fairly uniform wall thickness. A base 18 having a wall thickness of about 0.050 inches has performed satisfactorily when used with a molding having a wall thickness of 0.012 inches.

The normal extruded cross sectional shape of the base 18 is illustrated in FIG. 4. From this view the base 18 will be seen to have a central longitudinally extending flat web 20 provided with longitudinally spaced apertures 22 (FIG. 3) for the reception of studs 24 welded to the automobile roof 10. Retainer clips 26 are fitted under the heads of the studs 24 to secure the base 18 in place on the roof 10. Under such circumstances, the base 18 is stressed out of its normal shape into the shape illustrated in FIG. 2. As illustrated in both FIGS. 2 and 4, a pair of inner walls 28 extend upwardly and outwardly from the outer edges of the web 20 and are connected at their upper ends to a pair of generally horizontal supporting ledges 30. The outer edges of the ledges 30 are joined to a pair of depending outer walls 32 which are provided with outturned feet 34 at their lower ends. Outwardly facing longitudinally extending grooves 36 are formed at the lower ends of the outer walls 32 to define generally downwardly facing shoulders 38 spaced above the feet 34.

In its normal or relaxed shaped, the web 20 will be seen to be located in a plane raised above the plane of the feet 34. Furthermore, the ledges 30 are downwardly and outwardly inclined in the normal position of the base 18. However, when the base 18 is fitted on the automobile roof 10, the web 20 is brought downwardly into coplanar relation with the feet 34, which brings the ledges 30 into coplanar horizontal positions.

The molding 16 includes a pair of coplanar transversely spaced supporting surfaces 40 which are separated by a depressed central portion 42 of the molding 16. A pair of sidewalls 44 extend downwardly from the outer edges of the supporting walls 40 and terminate at their lower ends in inturned lips 46. The lips 46 engage the shoulders 38 and resiliently clamp the sidewalls 32 therebetween, holding the supporting surfaces 40 of the molding 16 downwardly on the supporting ledges 30 of the base 18. The opposite ends of the base 18 are angularly cut as indicated at 48 (FIG. 3) in order to conformably engaged formed end walls 50 of the molding 16.

The molding 16 and base 18 have a unique interrelationship in which they compliment one another and combine to achieve the desired end result. The base 19 possesses sufficient columnar strength in its inner walls 28 and outer walls 32 to support the weight of luggage or any object placed on the horizontal walls 40 of the molding. The base 18 also serves as a retainer for holding the molding 16 in place on the roof 10. Furthermore, the base 18 serves as a mounting pad insulating the metallic molding 16 from the automobile roof 10 and preventing the molding from scratching the paint of the roof 10. On the other hand, the molding 16 contributes a bright ornamental appearance to the slat assembly and covers the mounting studs 24. Furthermore, the hard surface of the molding 16 prevents the molding 16 from being damaged or broken by luggage placed roughly on the luggage rack. Furthermore, the molding 16 offers resistance to outward bowing or deflection of the outer base walls 32. Together, the component parts of the slat assembly 14 serve to hold luggage or other objects off of the roof 10 and structurally reinforces the roof 10 against undesired deflection.

It will be noted that it is unnecessary to impart any molded-in longitudinal curvature to the base 18 as the base 18 possesses sufficient resiliency to conform to any normally encountered roof curvature. The molding 16 is assembled on the base 18 simply by manual downward pressure against the base 18. During such installation the lips 46 engage the downwardly and outwardly inclined outer sides of the outer wall parts until they are able to enter the grooves 36 and engage the shoulders 38. This type of installation is relatively easily accomplished and helps to minimize the cost of assembly of the luggage rack.

What is claimed is:

1. In a luggage carrier for a car top, a load supporting slat having an extruded body provided with a central web and with an inverted channel portion at each side, the bottom of the outer sides of the channel portions extending below the web, the outer walls of the inverted channel portions remaining stationary when the bottoms thereof engage the car top and the web is moved downwardly into engagement with the top, wherein sloping webs are provided at the top of each of the inverted channel portions which move into substantial planar relation when the outer sides of the extruded body are relatively moved upwardly as the central web is moved down to engage the car top, said webs to provide support in a vertical direction for a metal molding, means securing the central web to the car top, and a metal molding having a downwardly offset central web and inwardly downwardly presenting channels at the sides, the uppermost portions of each of said metal molding channels supported by the planar tops of the adjacent respective portions of the body, the outer sides of the metal molding channels engaging a substantial portion of the outer sides of the channels of the body to prevent the extruded body from bulging outwardly when the carrier is loaded.

2. In a luggage carrier for a car top as recited in claim 1, wherein the bottom end of the outer sides of the channel elements has an outwardly presenting longitudinally extending groove.

3. In a luggage carrier for a car top as recited in claim 1, wherein the outer sides of the inverted channels of the metal molding has the bottom ends inturned to form said securing means for the molding when extending into said longitudinally disposed grooves.

4. In a luggage carrier for a car top as recited in claim 1, wherein the ends of the extruded body are sloped at an angle of approximately 45° to be engaged by the sloping ends of the decorative metal molding which are provided with the same slope.

* * * * *

UNITED STATES PATENT AND TRADEMARK OFFICE
CERTIFICATE OF CORRECTION

PATENT NO. : 4,055,285

DATED : October 25, 1977

INVENTOR(S) : John A. Bott

It is certified that error appears in the above-identified patent and that said Letters Patent are hereby corrected as shown below:

Reference "3,836,194" should be --3,856,194--; Column 1, line 33, "but" should be --by--; Column 2, line 29, "shaped" should be --shape--; Column 2, line 48, "engaged" should be --engage--; Column 2, line 51, "base 19" should be --base 18--.

Signed and Sealed this

Thirtieth Day of May 1978

[SEAL]

Attest:

RUTH C. MASON
Attesting Officer

LUTRELLE F. PARKER
Acting Commissioner of Patents and Trademarks